(12) United States Patent
Sundel

(10) Patent No.: US 8,170,951 B2
(45) Date of Patent: *May 1, 2012

(54) METHOD AND APPARATUS FOR FACILITATING SHIPMENT OF PACKAGES

(75) Inventor: Michael B. Sundel, Alexandria, VA (US)

(73) Assignee: Worldpak, Inc., McLean, VA (US)

(*) Notice: Subject to any disclaimer, the term of this patent is extended or adjusted under 35 U.S.C. 154(b) by 249 days.

This patent is subject to a terminal disclaimer.

(21) Appl. No.: 12/618,274

(22) Filed: Nov. 13, 2009

(65) Prior Publication Data

US 2010/0057596 A1 Mar. 4, 2010

Related U.S. Application Data

(63) Continuation of application No. 09/996,825, filed on Nov. 30, 2001, now Pat. No. 7,620,583.

(51) Int. Cl.
*G06Q 40/00* (2012.01)
(52) U.S. Cl. ......... 705/37; 705/35; 705/36 R; 705/36 T; 705/38
(58) Field of Classification Search ............... 705/35–38; 713/201
See application file for complete search history.

(56) References Cited

U.S. PATENT DOCUMENTS

| | | | |
|---|---|---|---|
| 4,286,325 A | 8/1981 | Dlugos et al. | |
| 4,365,148 A * | 12/1982 | Whitney | 235/383 |
| 4,790,118 A * | 12/1988 | Chilcoate | 53/411 |
| 5,038,283 A | 8/1991 | Caveney | |
| 5,072,397 A | 12/1991 | Barns-Slavin et al. | |
| 5,117,364 A | 5/1992 | Barns-Slavin et al. | |
| 5,262,939 A | 11/1993 | Vanpoucke | |
| 5,333,298 A * | 7/1994 | Bland et al. | 719/310 |
| 5,410,693 A * | 4/1995 | Yu et al. | 1/1 |
| 5,468,110 A * | 11/1995 | McDonald et al. | 414/273 |
| 5,485,369 A | 1/1996 | Nicholls et al. | |
| 5,541,394 A | 7/1996 | Kouchi et al. | |
| 5,586,037 A * | 12/1996 | Gil et al. | 705/407 |
| 5,593,267 A * | 1/1997 | McDonald et al. | 414/273 |
| 5,631,827 A | 5/1997 | Nicholls et al. | |
| 5,664,110 A | 9/1997 | Green et al. | |
| 5,666,493 A | 9/1997 | Wojcik et al. | |
| 5,694,551 A | 12/1997 | Doyle et al. | |
| 5,729,459 A | 3/1998 | Brandien et al. | |
| 5,897,622 A | 4/1999 | Blinn | |
| 5,968,110 A | 10/1999 | Westrope et al. | |
| 5,987,429 A | 11/1999 | Maritzen et al. | |
| 5,995,950 A | 11/1999 | Barns-Slavin et al. | |
| 6,003,010 A | 12/1999 | Scolly et al. | |
| 6,041,318 A | 3/2000 | Danford-Klein et al. | |
| 6,047,271 A | 4/2000 | Danford-Klein et al. | |

(Continued)

*Primary Examiner* — Narayanswamy Subramanian
(74) *Attorney, Agent, or Firm* — Carlos R. Villamar; The Villamar Firm PLLC

(57) ABSTRACT

A method and apparatus for facilitating the shipment of a package or packages, each package containing one or more items, from a Sender to a Recipient, via one of a number of shippers. The apparatus includes a database for storing shipper data, a processor for processing the data in the database, a Sender's terminal for selectively receiving and sending shipment information to and from the processing system, a first communications link for selectively enabling communication between the database/processor and the Sender's terminal, a second communications link for selectively communicating between the database/processor and the shipper of the package(s), and a third communications link for selectively communicating between the database/processor and customs facilitation entities such as customs brokers. The Internet may be used as at least one of the communication links, and the database may be made available through a Web site.

17 Claims, 6 Drawing Sheets

U.S. PATENT DOCUMENTS

| | | |
|---|---|---|
| 6,064,981 A | 5/2000 | Barni et al. |
| 6,085,170 A | 7/2000 | Tsukuda |
| 6,246,778 B1 | 6/2001 | Moore |
| 6,460,020 B1 | 10/2002 | Pool |
| 6,974,928 B2 | 12/2005 | Bloom |
| 7,035,856 B1 | 4/2006 | Morimoto |
| 7,143,290 B1 | 11/2006 | Ginter et al. |
| 7,620,583 B2 | 11/2009 | Sundel |
| 7,739,202 B2 * | 6/2010 | Kadaba ............... 705/338 |
| 7,774,284 B2 * | 8/2010 | Williams et al. ......... 705/300 |
| 7,844,481 B2 * | 11/2010 | Hilbush et al. .......... 705/7.13 |
| 2002/0032612 A1 | 3/2002 | Williams et al. |
| 2002/0065738 A1 | 5/2002 | Riggs et al. |
| 2002/0120475 A1 | 8/2002 | Morimoto |
| 2002/0178074 A1 | 11/2002 | Bloom |
| 2003/0065725 A1 | 4/2003 | Delmer et al. |
| 2003/0065726 A1 | 4/2003 | Wells et al. |
| 2003/0065949 A1 | 4/2003 | Le et al. |
| 2003/0069831 A1 | 4/2003 | Le et al. |
| 2005/0119786 A1 * | 6/2005 | Kadaba ............... 700/224 |
| 2007/0073551 A1 * | 3/2007 | Williams et al. ......... 705/1 |
| 2007/0203818 A1 | 8/2007 | Farmer et al. |
| 2008/0255863 A1 * | 10/2008 | Mack et al. ........... 705/1 |
| 2008/0255864 A1 * | 10/2008 | Aubuchon et al. ....... 705/1 |
| 2010/0332284 A1 * | 12/2010 | Hilbush et al. ......... 705/9 |
| 2011/0029447 A1 * | 2/2011 | Kadaba ............... 705/338 |
| 2011/0125665 A1 * | 5/2011 | Kadaba ............... 705/333 |
| 2011/0246384 A1 * | 10/2011 | Williams et al. ......... 705/335 |

* cited by examiner

METHOD AND APPARATUS FOR FACILITATING SHIPMENT OF PACKAGES

CROSS REFERENCE TO RELATED DOCUMENTS

The present invention is a continuation of U.S. patent application Ser. No. 09/996,825 of SUNDEL, Michael B., entitled "METHOD AND APPARATUS FOR FACILITATING SHIPMENT OF PACKAGES," filed on Nov. 30, 2001, now allowed, the entire disclosure of which is hereby incorporated by reference herein.

BACKGROUND OF THE INVENTION

1. Field of the Invention

The invention relates to an improved shipping method and system for facilitating shipments and management thereof, and more particularly to such a system and method for facilitating a shipment of a package of items from a Sender to a Recipient through one of a multitude of shipping mechanisms.

2. Description of the Related Art

Individuals and companies rely heavily on the timely and accurate shipment of packages to both national and international destinations. Economic transactions, at one time mostly limited to local or regional transactions, have expanded in scope to include virtually every country in the world. Many factors have led to this, including consumer demand in one area for a product from another area, and the manufacturing of an item in a particular area to take advantage of local skills, resources, or labor rates. Accordingly, package shipments have become ever more important and frequent. The term "shipment" as used herein encompasses any flow of goods from a Sender to a Recipient, including returns of items to the Sender.

While some of the very largest companies may have their own systems for shipping packages, in general a Sender (i.e., the entity originating the shipment) that desires to ship a package to a destination will employ a designated shipping company, or shipper, to effect the delivery of the package. The terms "shipper" and "shipping mechanism" will be used interchangeably herein to refer to any entity or entities responsible for effecting shipment of packages. Such a Sender must take into account many factors. As an example, a Sender may desire to determine the optimal shipper and shipment method (e.g., air or ground) based on shipping cost, speed of delivery, the shipper's expertise in handling a particular type of shipment or destination, or other particularities associated with each shipper and shipment method. The term "shipping assignment" as used herein means a particular shipper/shipment method combination. The Sender must keep track of a myriad of shipment-specific details, as well. For example, the Sender must know where a particular shipment is to be dispatched; how many packages the shipment comprised; whether and when the shipment arrived at the destination; whether the shipment or parts of it were returned to the Sender; and how much in duties, taxes and/or customs fees need to be paid in connection with delivery or refunded upon return. Moreover, this information is desirable not just on a shipment basis, but on a package basis, and, if possible, on an item basis. The term "package" as used herein refers to a shipped container and its contents. The term "item" as used herein refers to individual products in a package. A package can be a box, crate, carton or a plurality of the same banded together as a single entity.

The prior art has addressed various aspects of these concerns. For example, U.S. Pat. No. 5,968,110 discloses a method for facilitating cross-border transactions in an electronic catalog environment. All order processing and order entry procedures originate at an order processor located in the destination country, and an affiliate in the destination country handles all customs issues. U.S. Pat. Nos. 5,631,827 and 5,485,369 each disclose a system for automating transportation of goods. Rules are used to determine the most appropriate shipping method.

However, the prior art fails to provide a flexible solution for facilitating shipment of items in packages from one destination to another. For example, the prior art provides no flexible means for tracking individual items shipped via a shipper for handling returns or the like. This shortcoming is particularly problematic for international shipments that may be subject to the assessment of duties, taxes and/or customs fees.

SUMMARY OF THE INVENTION

A first aspect of the invention is a method for facilitating the shipment of a package containing items from a Sender to a Recipient via a shipping mechanism. The method comprises storing package data, including item data, in a database; retrieving shipment tracking data from the shipping mechanism; adding the shipment tracking data to the database; correlating the package data in the database with the shipment tracking data; and permitting an authorized user to query the database.

A second aspect of the invention is an apparatus for facilitating the shipment of a package containing items from a Sender to a Recipient. The apparatus comprises a processor having a database for storing and processing package data including item data; a Sender's terminal for selectively communicating with the processing system; a first communications link adapted for selectively enabling communication between the processing system and the Sender's terminal, for selectively transmitting the package data from the Sender to the processing system, and for selectively transmitting the package data relating to a selected package to the Sender's terminal responsive to the Sender's query; a shipper's terminal; a second communications link for selectively communicating between the processing system and the shipper's terminal; a customs facilitator terminal; and a third communications link for selectively communicating between the processing system and the customs facilitator terminal.

BRIEF DESCRIPTION OF THE DRAWING

The preferred embodiments of the invention may be more easily understood by reference to the following Figures, in which.

DETAILED DESCRIPTION OF THE PREFERRED EMBODIMENT

A preferred embodiment of the invention is a shipment data tracking system and method in which each item in an order can be tracked individually, regardless of the physical package in which it is shipped. Accordingly, returns can be handled on an item-by-item basis, rather than on a shipment-by-shipment basis. The Sender can easily refund all charges, including any duties, taxes, or customs fees that were assessed, upon return of the item or the package. Further, items are correlated to an accurate description thereof to facilitate customs clearance of each item. Detailed shipment information is entered and stored in a central database. Each package, and each item in each package, can be tracked and the results made available over a network, such as the Internet. This audit trail allows the Sender, the Recipient, or any other authorized user to query the database and view shipping and return information, including package information, tracking information, invoices, pending refunds, and the like. Furthermore, forms can be requested from the database via the Internet and subsequently printed by an authorized user. Such forms may include address labels, shipping labels, customs manifests, and related documents.

The most cost-effective shipping assignment can be selected by the system based on various criteria, including the Sender's parameters, the weight of the package, the value of the items, the description of the items, the country of dispatch, and the destination. User-defined input can override the system's selections at various points based on external criteria. Further, all required documentation can be completed by the system and accessed over a network such as the Internet to allow on-site printing.

Returns and undelivered packages can be efficiently handled. Multiple returns centers in multiple cities or countries can use the system simultaneously. Senders do not have to provide additional data or take any other actions as the system uses data already in the database. Authorized users may retrieve the relevant shipment data based on various search criteria, such as order number, tracking number, the Recipient's name, or the Recipient's postal code, and edit the data to reflect details of the return. Those details may include which items were returned, reasons provided by the Recipient, and the disposition sought, such as exchange or refund.

Figure 1:
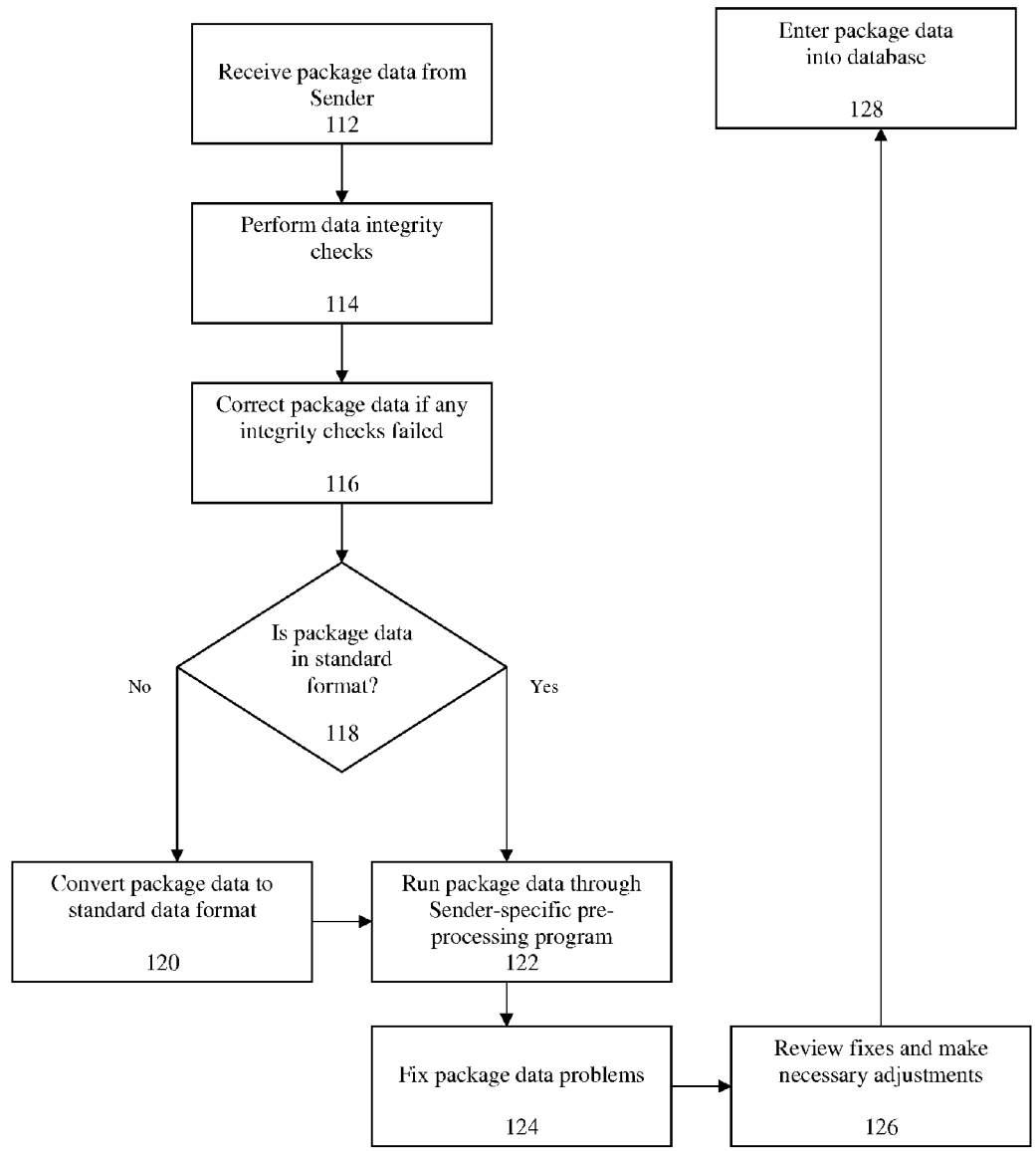
FIG. 1 is a flow chart of the method for pre-processing of shipment data according to the preferred embodiment of the invention.
Figure 6:
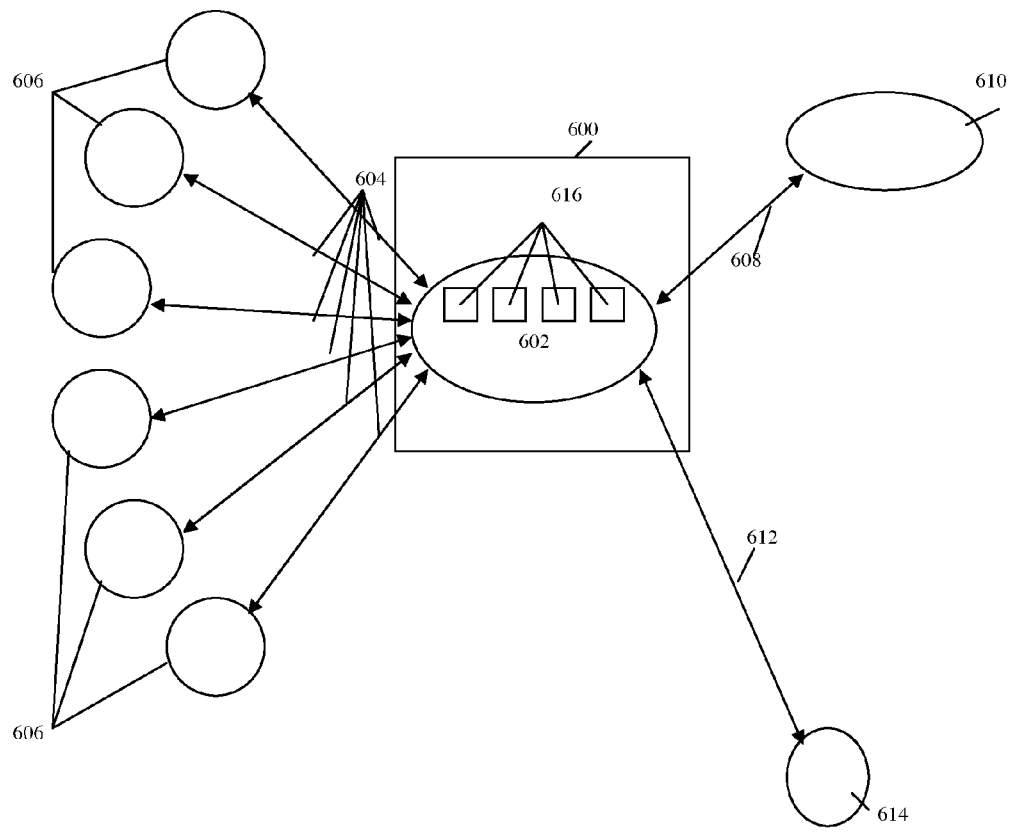
FIG. 6 is a schematic diagram of a computer system according to the preferred embodiment of the invention.

As illustrated in FIG. 1, the first step in the process is the pre-processing of package data. Package data is initially received, in step 112, from the Sender, and rendered as record 616 into a format that can be entered into database 602 (FIG. 6). There can be one record 616 per package or plural records 616 per package, or package data for plural packages can be stored in a single record.

Databases are generally known, and are basically electronic filing systems for collections of information organized in such a way as to allow users to select desired pieces of data. One type of database is organized by fields, records, and files. A field is a single piece of information; a record is a complete set of fields; and a file is a collection of records. Database information can be accessed through a database management system (DBMS), which is a collection of programs that enables a user to enter, organize, and select data in a database. The term "database" as used herein should be understood to encompass any collection of information. The term database should further be understood to encompass both single-computer databases and distributed databases running on several computers or other devices.

The package data can include item data. The term "item data" as used herein refers to data relating to the characteristics of items in the package. Item data may include data indicative of the identity, size, weight, value, quantity, and country of origin of each item. The package data may also include the country of dispatch, value, destination, weight, Sender's name, Recipient's name, etc. The package data will be used later by the system to determine, on a package-by-package basis, the optimal shipping assignment. The preferred embodiment allows the Sender to transmit the package data in almost whatever format the Sender chooses to use. This includes such variations as data transmissions using a standard format, data "dumps" from the Sender's order-taking system, spreadsheets attached to E-mail messages, or physical embodiments such as copies of packing slips. Naturally, the farther the data is from being ready to be inputted into the system, the more manipulation the data needs prior to input. For example, if the shipment data is in an electronic form that can be directly added to the database, then intermediate manipulations of the data are minimized On the other hand, if the data is in the form of, for example, an E-mail attachment or a facsimile, then the data may need to be manually formatted for input into the database.

Even if the data has been fully prepared by the Sender, a data integrity check, in step 114, may initially be performed on the received data to ensure that any necessary information is included and is generally correct based on pre-defined rules or limits. For example, the package data may contain improperly formatted postal codes. Should the data fail such an integrity check, the errors can be corrected automatically or manually, in step 116, such as by contacting the Sender for more or correct information.

The data may then be additionally evaluated, in step 118, to ensure that it is in a pre-defined standard format. Using the example from above, if shipment data has been received in the form of an E-mail attachment, it may need to be formatted to be entered into database 602. Such formatting is generally well known. For example, various known algorithms can be used to convert data from one format to another.

Each Sender may introduce peculiarities into its data on a consistent basis. For example, a particular Sender may prefer to submit package data in metric rather than English measurements. Therefore, it may be preferred to run the package data through a Sender-specific pre-processing program, in step 122, which can correct for these anomalies, in step 124, and further ensure sufficient data uniformity. Again depending on the Sender, a review of the fixes performed by the prior steps may be performed at this point and the necessary adjustments made to the package data, in step 126. The data is finally entered, in step 128, into the database. At this time, if the Sender has not already affixed one, a bar code label or other identification mechanism can be generated and affixed to the package to correlate the package data to the physical package.

Figure 2:
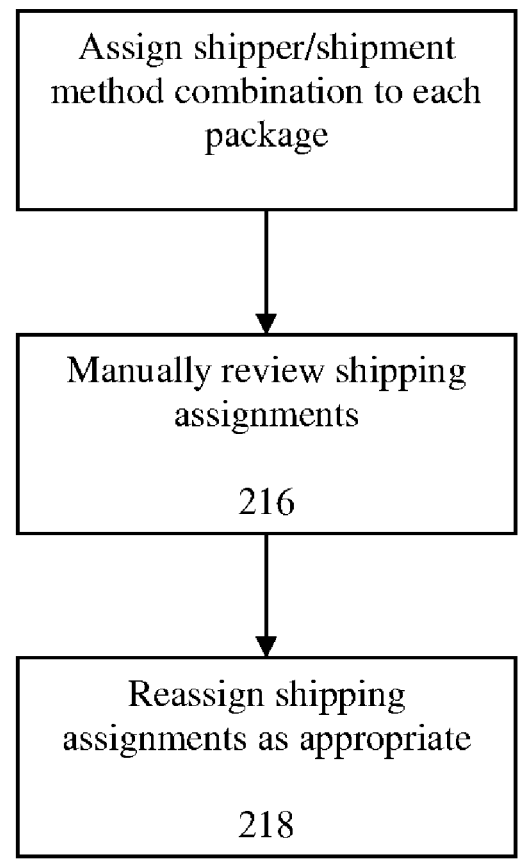
FIG. 2 is a flow chart of the method for processing of shipment data according to the preferred embodiment of the invention.

The formatted data is then run through processing steps, as indicated in FIG. 2, by processor 600 in communication with the database 602 (FIG. 6). The processor is preferably a programmable computer running software that can read data from database 600 and accomplish the other functionality described herein. However, the processor can be any logic device for accomplishing functionality similar to that described herein. The first of these processing steps is evaluating the package data from a particular shipment making a shipping assignment for each package, in step 214. This assignment can be made based on a number of package-specific and item-specific variables contained in the package data, including the Sender's relative preferences for speed versus cost of delivery. For example, a particular Sender may more highly value a faster delivery time relative to a lower cost, while another Sender may more highly value an economical shipment cost relative to a faster deliver time. If these preferences are in the database associated with each Sender, or are attached to the package data, then the processor may use this information in making the shipping assignment. The shipping assignment may be made based on rules or comparison to shipping information provided by the potential shippers.

The Sender may at this point opt for a manual review, in step 216, of the processor's proposed shipping assignment(s) and may override the assignment if, for example, additional information is known about a particular shipper or package that is not in the database. For example, if it is known that a particular shipper has a backlog of deliveries and the normal shipping times associated with that shipper may not apply, then it may be desirable manually to change the shipping assignment, in step 218, by selecting the next best shipper.

Figure 3:
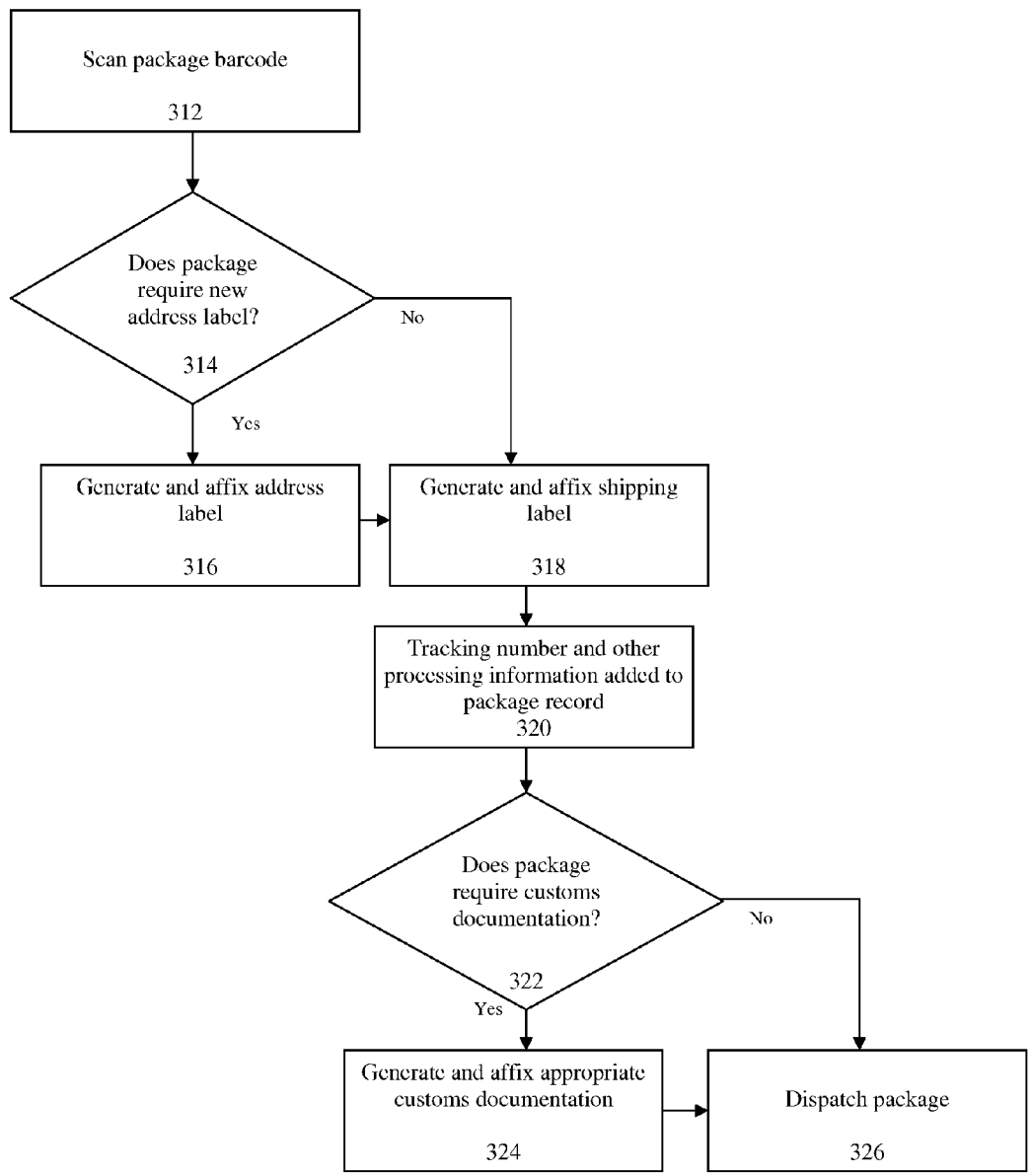
FIG. 3 is a flow chart of the method for package processing according to the preferred embodiment of the invention.

FIG. 3 illustrates steps taken to process packages to be shipped. These steps can be effected at the Sender's location, for example, in its shipping and receiving area, or they can be effected at an intermediate shipping location apart from the Sender's location, for example, at a remote warehouse. As noted above, the package to be shipped is preferably already coded with an identifying barcode as noted above, which is initially scanned, in step 312. This scanning may be effected by scanning equipment well known in the art and not described here in detail. The identifying information contained in the barcode will allow the package data to be correlated to the package. Based on the package data in database 602, processor 600 can determine whether the package requires a new address label, in step 314. If so, then the processor can generate an address label, which can be printed on a printer at the package's location and affixed to the package, in step 316. Such an address label may be needed if, for example, the package is to be shipped from an address remote from the Sender, such as from a remote warehouse. The shipping label, which will bear the information required in connection with the package's shipping assignment (such as a barcoded tracking number and shipper-determined sort codes), is then generated, printed, and affixed to the package, in step 318.

The tracking number from the shipping label and other information is then added, in step 320, to the corresponding record 616 in the database. This information will enable tracking of the items in the package to, and, if necessary, from, the Recipient. Note again that the package data in the database includes item data, and thus, each item can be tracked using the corresponding tracking number. Also, the package data may contain detailed information about the point of dispatch and the destination of the package. The processor can further add processing codes, such as entry point information if the package is destined for a particular port of entry into a country. The processor determines if the package is being sent to an international destination by analyzing the package data. The processor determines whether the package requires a customs form and/or commercial bill of lading, in step 322, based on known customs requirements for the destination. If so, then the appropriate customs documentation is generated and manually or automatically affixed, in step 324, to the package. The package may then be dispatched, in step 326, to the shipper. In some cases, customs clearance can be based solely on data transmitted to a customs broker.

Figure 4:
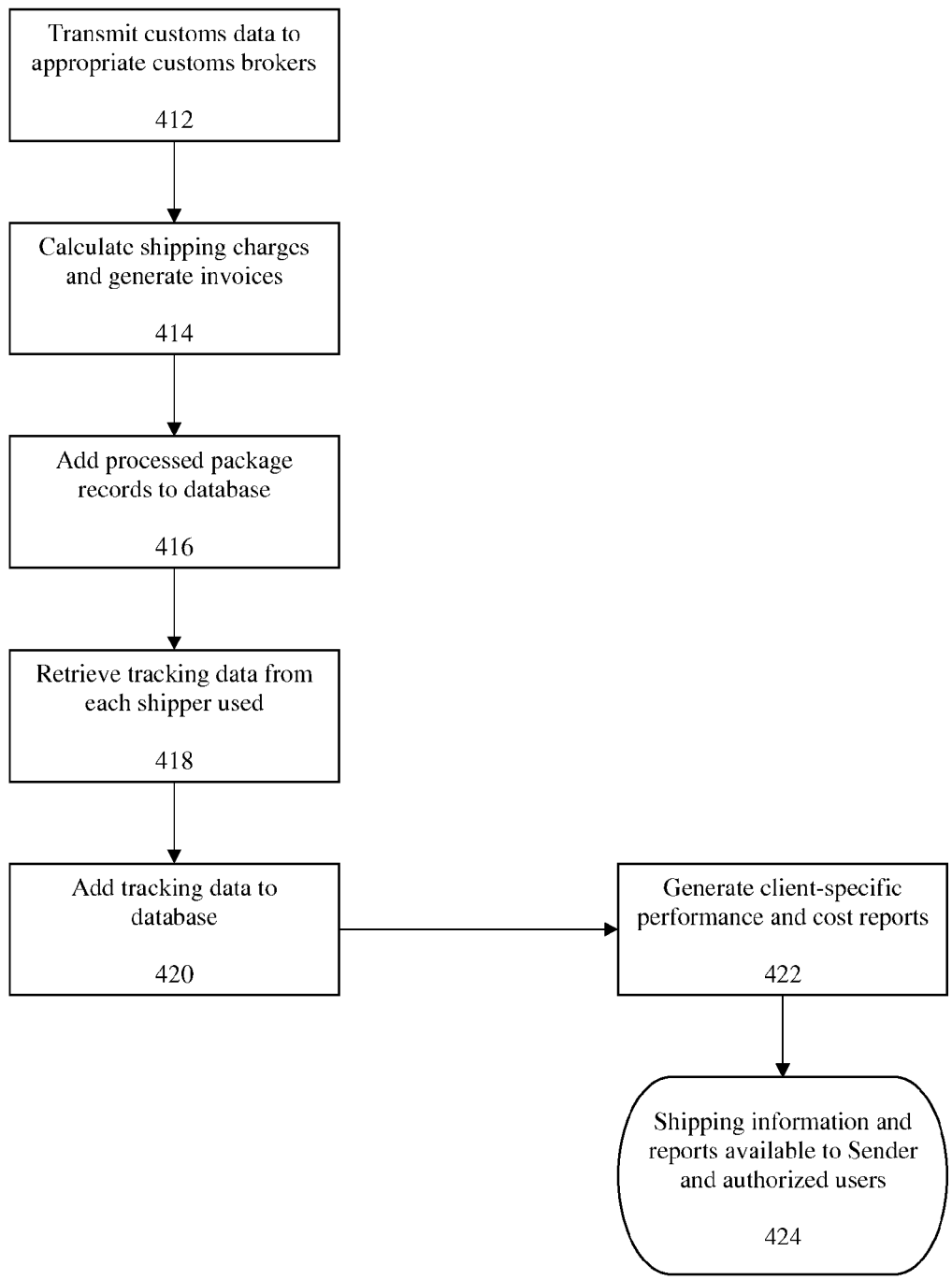
FIG. 4 is a flow chart of the method for updating a database of shipment data according to the preferred embodiment of the invention.

At this point, information is compiled regarding the package shipping transaction, i.e. shipment data, and this data is added to the database 602 in correspondence with other package data for that package. The steps of this process are illustrated in FIG. 4. Customs data, for example, item identification and value, is read from a record 616 and transmitted, in step 412, to the appropriate customs brokers, which utilize this information for facilitating a smooth passage of the package through the appropriate customs offices. Actual shipping costs may then be calculated by the processor, in step 414, including the customs charges for each item in the package, based on the value of the items in the package and the prevailing duty and tax rates and customs fees in the country of destination. This calculation is especially important in the case of a subsequent return of an item or entire shipment, for example. At the same time, shipping invoices are generated and may be printed or viewed remotely from the processor. All of this information, and any overriding information received, such as information from the customs broker, is then added to the database, in step 416.

The next step is periodically to retrieve tracking data, in step 418, from each shipper that has been used, and to add this data to the appropriate record 616 in the database 602, in step 420. Such tracking data is updated periodically by the shipper, and this information may be automatically queried by the processor on a preset schedule, for example every hour. This querying can be continued until the package is indicated as delivered or as returned as non-deliverable. Finally, performance and cost reports are generated, in step 422, based on the package data. Such reports may include delivery time reports, delivery exception reports (such as bad addresses), marketing reports (such as distributions of customers by province or country, most popular items by country, etc.), shipping cost as a percentage of order value reports, revenue by Sender reports, and cost by shipper reports. Shipment information and reports are then made available to the Sender or its authorized users, in step 424. It is noted here that the Sender and its authorized users do not necessarily require direct access to the database. Instead, the database may be available as part of a Web site and the Sender and its authorized users may access the database and submit queries through the Web site, or the data may be made available in any other manner.

Figure 5:
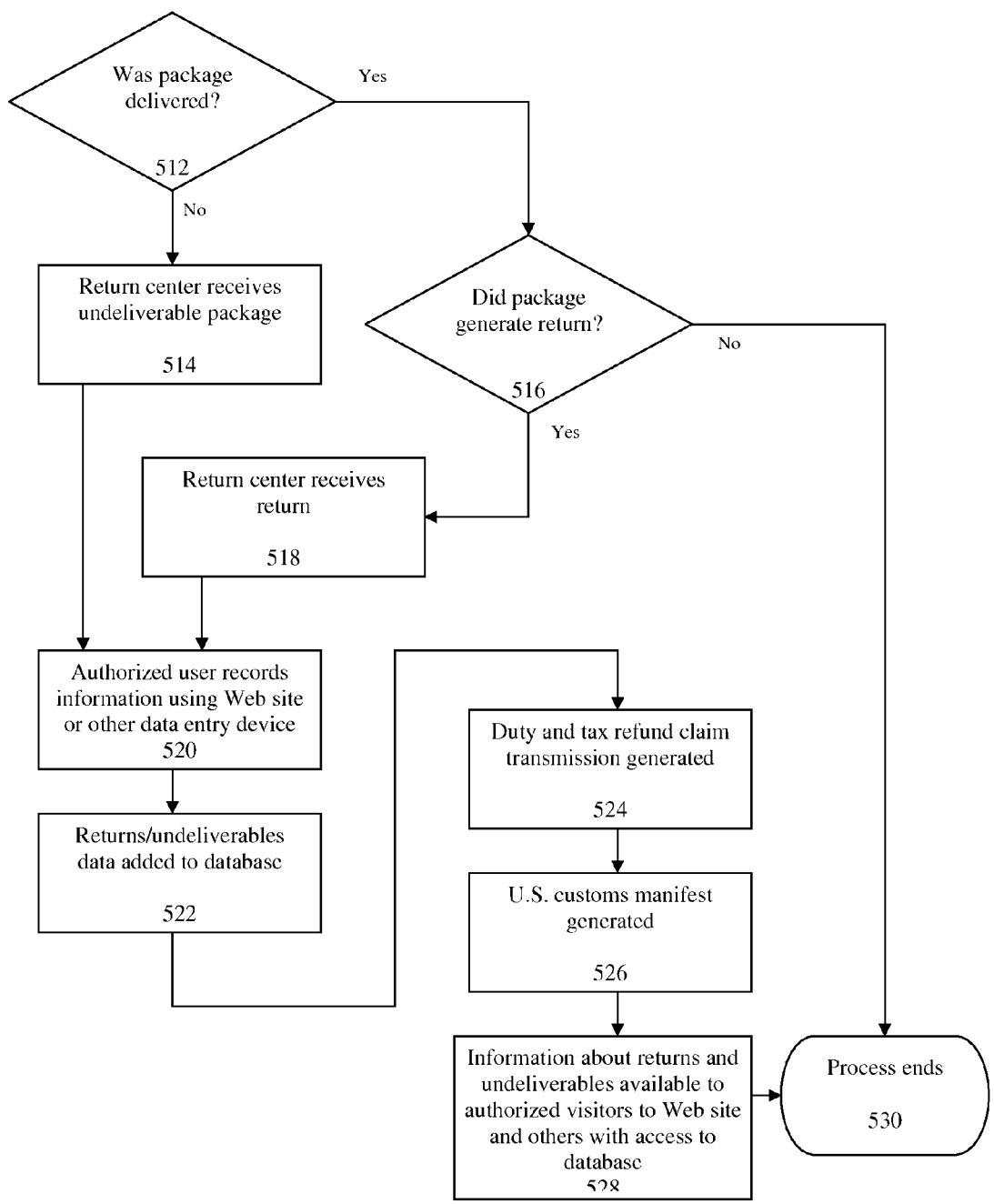
FIG. 5 is a flow chart of the method for processing shipment returns according to the preferred embodiment of the invention.

FIG. 5 illustrates the steps for processing returned items. A first query is made of the shipment data in the database 602, in step 512, to determine whether the package was delivered to the Recipient's destination, based on tracking data obtained from the shipper. If not, then the Sender's return center would have received, in step 514, the undeliverable package without its ever having been under the Recipient's control. The Sender's return center is defined here as the Sender's designated entity for receiving returned shipments, packages, and items. For international shipments, it is often desirable to have a return center located within the country of destination. If the package was in fact delivered to the Recipient, then a next query of the database is made, in step 516, to determine whether the package generated a return, i.e., whether some or all of the items in the package were received by the return center. Whether the return center received the package as undeliverable or received items as a return, the succeeding steps can be the same. The Sender or its agent records the returned item information, in step 520, and this information is added, in step 522, to the database 602. For example, upon receipt of a returned package, the return center personnel can examine the returned items and access record 616 corresponding to the returned item based on the order number, tracking number, recipient identity, or any other available information. The personnel can then use a data entry device to modify record 616 to reflect the identity and quantity of returned items. The data entry device can prompt the user to enter any shipping fees paid by the customer, notes relating to the reason for return, or any other relevant information.

Next, for certain international shipments, a duty and tax refund claim is generated, in step 524, based on the information in record 616, which is used to initiate refund actions for the duty and tax paid on the item, if any. This claim can be completed based on the item duty and tax rate information in the database 602. This claim may be submitted either by the Sender or automatically by the processor, depending on the Sender's preference. A U.S. (or other appropriate country) customs manifest can be generated, in step 526. Note that this customs manifest will facilitate re-entry of the return items into the country of dispatch. All information in the database can be made available, in step 528, to the Sender or its authorized agent. For example, the Sender can query the database for information relating to the status of all items and returned items based on dates, item type, or any other criterion.

The system also can be used to process returns when the original entry data is not in the database, such as, for example, when a Canadian Recipient returns merchandise that he bought from the Sender's store while visiting the United States. In such a case, the information may not already be in the database 602, but can be entered by the return center personnel upon receipt of the returned items. From that point, the returns process is similar to the above scenario. The Sender or its agent records the return information, in step 520, and the returned item data is added, in step 522, to the database. Next, a duty and tax refund claim can be generated, in step 524. A U.S. customs manifest (or similar documentation for any other appropriate country) can be generated, in step 526. As above, a claim may be submitted either by the Sender or automatically by the processor, depending on the Sender's preference.

An apparatus for facilitating the shipment of a package is illustrated in FIG. 6. The apparatus can be used to accomplish the procedures described above. The apparatus includes a processor 600 and a database 602 adapted in accordance with the preferred embodiment for storing and processing shipper, customs, and shipment data. As noted above, one type of database that can be used is organized by fields, records, and files, a field being a single piece of information; a record being a complete set of fields; and a file being a collection of records. The database 602 contains records 616, each of which contains a number of fields, the fields containing the package data.

A first communications link 604 connects the processor/database 602 with the Sender's terminal 606, which is adapted for selectively sending data to and receiving data from the database 602. A second communications link 608 allows transfer of data between a shipper's terminal 610 and the processor/database 602. A third communications link 612 allows communication between the processor/database 602 and a customs broker's terminal 614, the customs broker being an entity that facilitates entry of shipments into another country.

Recent advances in communication, the Internet in particular, have facilitated communication and data transmission. The Internet is a worldwide network of computers linked together by various hardware communication links all running a standard suite of protocols known as TCP/IP (transmission control protocol/Internet protocol). The growth of the Internet over the last several years has been explosive, fueled in the most part by the widespread use of software viewers, known as browsers, and HTTP (hypertext transfer protocol) which support the use of a simple GUI (graphical user interface) to communicate. Browsers generally reside on client computers used to access the Internet. HTTP is a component of TCP/IP and provides users access to files of various formats using a standard page description language known as HTML (hypertext markup language). The collection of servers on the Internet using HTTP has become known as the "World Wide Web," or, simply, the "Web".

Through HTML and interactive programming protocols, the author of a particular Web page is able to make information available to viewers of the Web page by placing the Web page on an Internet Web server in HTML format. The network path to the server is identified by a URL (Uniform Resource Locator) and, generally, any client running a Web browser can access the Web page by the URL.

Thus, the above-described shipment apparatus may be facilitated by use of the Internet. In such an arrangement, the communications link 604, the communications link 608, and the communications link 612 may all be accomplished over the Internet. The processor 600 may be on an Internet Web server.

The Sender's terminal 606 of the preferred embodiment includes a computer, for example, a personal computer, with access to the Internet. The Sender's computer can request a display of a Web page stored on the processor/database 602 by issuing a URL request through the communications link 604 to a processor in a known manner. A URL consistent with the present invention may be a simple URL of the form:

<protocol identifiers>://<server path>/<web page path>

A "protocol identifier" of "http" specifies the conventional hyper-text transfer protocol. A URL request for a secure Internet transaction typically utilizes the secure protocol identifier "https," assuming that the browser and Web server control application support and implement the secure sockets layer. The "server path" is typically of the form "prefix.domain," where the prefix is typically "www" to designate a Web server and the "domain" is the standard Internet subdomain.top-level-domain of the processor/database 602. The optional "web page path" is provided specifically to identify a particular hyper-text page maintained on the processor/database 602. CGI scripts, Active Server Pages, or other technologies can be used to facilitate interactivity over the Internet.

The input device of the preferred embodiment typically includes a keyboard, a mouse, a bar code scanner, and a scale. However, the input device can include any number or combination of a keypad, keyboard, mouse, bar code reader, text scanner, image scanner, scale, or any other device for inputting data.

Similarly, the shipper's terminal 610 may comprise a computer similarly configured and connected to the Internet for displaying and inputting data through the second communications link 608 to the processor/database 602. Likewise, the customs broker's terminal 614 may also comprise a computer similarly configured and connected to the Internet for displaying and inputting data through the third communications link 612 to the processor/database 602.

In such an arrangement, the Internet acts as the first, second, and third communications links 604, 608, and 612 between the processor/database 602 and the Sender's terminal 606, between the processor/database 602 and the shipper's terminal 610, and between the processor/database 602 and the customs broker's terminal 614.

The invention may be embodied in other specific forms without departing from the spirit or essential characteristics thereof. The disclosed embodiments are therefore to be construed in all respects as illustrative and not restrictive, the scope of the invention being defined by the appended claims, and all changes that come within the meaning and range of equivalency of the claims are therefore intended to be embraced therein.

I claim:

1. A computer implemented system for processing shipment and return of a package containing items from a Sender to a Recipient, the system comprising:
    a database configured to store package data, for the package, and including item data, for the items in the package, before shipment occurs;
    a shipping mechanism coupled to the database and configured to retrieve shipment tracking data, for tracking shipment of the package from the Sender to the Recipient and return of one or more items of the items of the package from the Recipient to the Sender;
    a computer processor coupled to the database and the shipping mechanism and configured to add the shipment tracking data to the database;
    the computer processor configured to correlate the package data in the database with the shipment tracking data for the package;
    the computer processor configured to determine whether the package requires customs clearance and, if so, to generate the appropriate customs documentation or data transmission to a customs broker;
    the computer processor configured to permit an authorized user to query the database for processing the shipment of the package from the Sender to the Recipient and the return from the Recipient to the Sender of the one or more items of the items of the package; and
    the computer processor configured to render data for display to an authorized user, based on a query of the database for shipping parameters of the package from the Sender to the Recipient and return from the Recipient to the Sender of the one more items of the items of the package,
    wherein the computer processor is configured to add returned item information to the database if items from the package are returned to the Sender;
    in the case of international shipments, the computer processor is configured to prepare duty and tax refund claims based on the returned item information and the corresponding item data; and
    the computer processor is configured to add duty and tax refund information to the data base.

2. The system of claim 1, wherein the computer processor is configured to assign the package to a specific combination of a shipper and shipping method based on the package data.

3. The system of claim 1, wherein the package data includes at least the originating address and the destination address, and the item data includes a description of the items in the package, and
    the computer processor is configured to use the package data to calculate shipping charges and generate invoices associated with the shipment.

4. The system of claim 3, wherein the item data includes the description and value of each item.

5. The system of claim 3, wherein the computer processor is configured to store package data, including transmitting package data via the Internet.

6. The system of claim 3, wherein the computer processor is configured to receive a query over a computer network and transmit data from the database over the computer network in response to the query parameters.

7. The system of claim 6, wherein the computer network comprises the Internet.

8. The system of claim 1, wherein the computer processor is configured to receive a query over a computer network and transmit data from the database over the computer network in response to the query parameters.

9. The system of claim 8, wherein the computer network comprises the Internet.

10. The system of claim 1, wherein the computer processor is configured to select a shipping assignment for the package based on the package data.

11. The system of claim 1, wherein the computer processor is configured to generate appropriate shipping documents for the package.

12. The system of claim 11, wherein said shipping documents comprise package labels.

13. The system of claim 11, wherein said shipping documents comprise shipping manifests.

14. The system of claim 11, wherein said shipping documents comprise customs forms.

15. The system of claim 1, further comprising:
    a Web site page configured to permit the authorized user to query the database.

16. The system of claim 1, wherein the computer processor is configured to generate duty and tax refund claims based upon receipt of returned item data.

17. The system of claim 1, wherein the computer processor is configured to add returned item information to said database if items from a package are returned to the Sender, and prepare duty and tax refund claims based on the returned item information.

* * * * *